William R. Mozier's Seed Planter.

PATENTED DEC 17 1867

No. 72318

United States Patent Office.

WILLIAM R. MOZIER, OF HIGGINSVILLE, ILLINOIS.

Letters Patent No. 72,318, dated December 17, 1867.

IMPROVEMENT IN SEED-PLANTERS.

*The Schedule referred to in these Letters Patent and making part of the same.*

TO ALL WHOM IT MAY CONCERN:

Be it known that I, WILLIAM R. MOZIER, of Higginsville, in the county of Vermillion, and State of Illinois, have invented a new and useful Improvement in Seed-Planter; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

My invention has for its object to furnish an improved seed-planter, so constructed as to furrow the ground and drop and cover the seed, and which, by removing the seed-dropping device, may be used to cultivate the crop; and it consists in the combination of the trigger, spring, pivoted lever, connecting-rods, crank, dropping-cylinder, and seed-box with each other and with the beam, handle, and standard of the cultivator-frame, as hereinafter more fully described.

Figure 1:
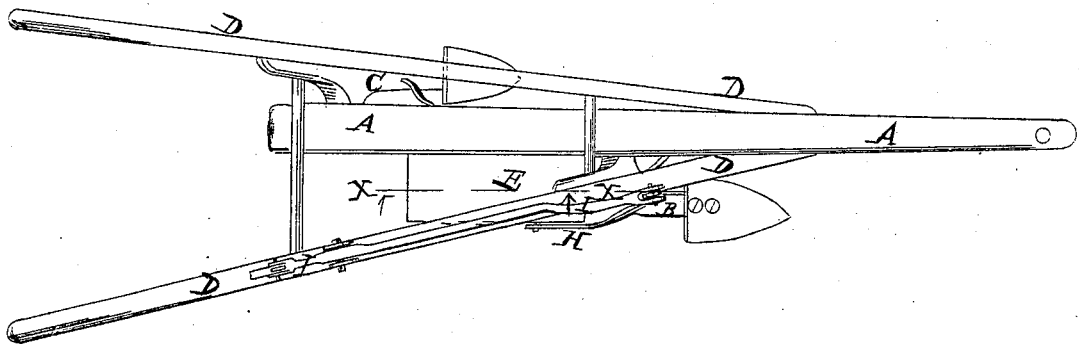
Figure 1 is a top or plan view of my improved planter.
Figure 2:
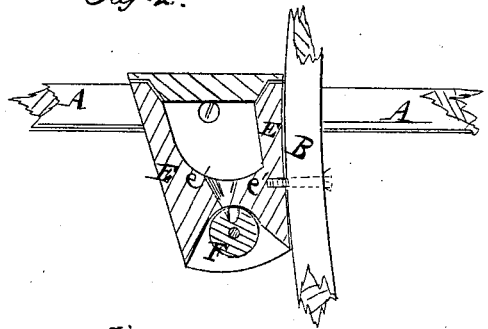
Figure 2 is a detail sectional view of the same, taken through the line $x$ $x$, fig. 1.
Figure 3:
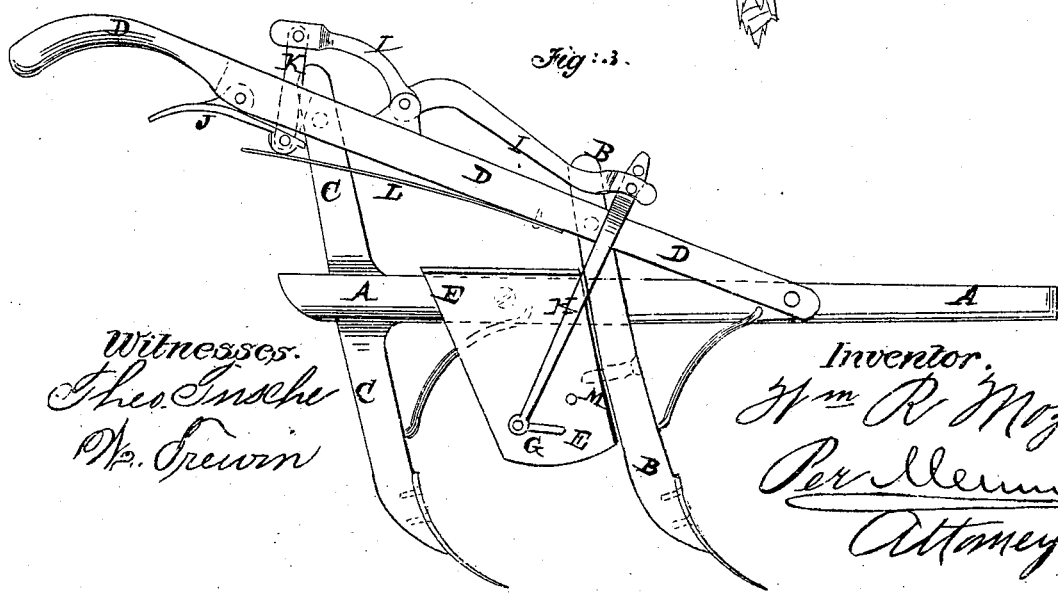
Figure 3 is a side view of the same.

A is the beam, to the forward end of which the draught is applied. B is the forward, and C is the rear-plough standard, which are attached to opposite sides of the beam A, the one forward of the other, as shown in figs. 1 and 2. D are the handles, which are attached to the beam A, and to the upwardly-projecting ends of the standards B and C, as shown in figs. 1 and 3. E is the seed-box, which is removably attached to the side of the beam A and to the rear side of the forward standard B. The bottom, $e'$, of the seed-box is placed a little above the lower edges of the side boards, so as to leave space for the reception of the dropping-cylinder F, the journals of which work in the sides of the seed-box E. The bottom or partition $e'$ of the seed-box has a hole formed through its central part, corresponding with a recess formed in the dropping-cylinder F, so that, when the cylinder is turned so as to bring the said recess directly beneath the said hole, enough seed may pass into the recess to form a hill. In all other positions the cylinder F wholly closes the opening through the bottom of the seed-box. G is a crank formed upon or attached to the journal of the cylinder F, to which is pivoted the lower end of the connecting-rod H, the upper end of which is adjustably pivoted to the forward end of the lever I, so that the movement of the crank G and cylinder F may be regulated at pleasure. The lever I is pivoted to the upper side of the handle D, and its rear end is connected to the forward end of the trigger or hand-lever J by the connecting-bar K. The trigger or hand-lever J is pivoted to the under side of the handle D in such a position as to be easily reached and operated by the workman to drop the seed. L is a spring, one end of which is attached to the under side of the handle D, and its other or free end rests against the forward end of the lever J, so as to bring the cylinder F back into such a position that the recess formed in it may correspond with the opening in the bottom of the seed-box as soon as the lever J is released by the workman. M is a stop-pin, against which the crank G strikes when the cylinder F has been revolved a sufficient distance to drop the seed, so that the crank may never become set upon its dead-point and the spring L be unable to bring the cylinder back to its place.

By this construction the ground will be furrowed and the seed dropped and covered by the same operation; and by removing the dropping-device the machine becomes simply a cultivator, and may be used in the ordinary manner for cultivating the crop.

I claim as new, and desire to secure by Letters Patent—

The combination of the trigger or hand-lever J, spring L, lever I, connecting-bars K and H, crank G, recessed cylinder F, and seed-box E, with each other and with the forward plough standard B, plough-beam A, and handle D, substantially as herein shown and described, and for the purpose set forth.

WILLIAM R. MOZIER.

Witnesses:
 A. S. PRICE,
 J. H. SMALLEY.